United States Patent Office 3,355,509
Patented Nov. 28, 1967

3,355,509
OLEFIN SEPARATION WITH STRONTIUM AND CADMIUM MOLECULAR SIEVES
James Leslie Carter, Chatham, Peter Joseph Lucchesi, North Plainfield, and Eugene Richard Nightingale, Jr., Murray Hill, N.J., assignors to Esso Research and Engineering Company, a corporation of Delaware
No Drawing. Filed July 15, 1965, Ser. No. 472,316
19 Claims. (Cl. 260—677)

ABSTRACT OF THE DISCLOSURE

Strontium and cadmium X and Y sieves at a critical temperature of —50° to 160° F. are used to separate olefins from paraffins.

The present invention relates to a process for separating olefins from hydrocarbon streams in which they are in admixture. More particularly, the present invention relates to the separation of straight chain olefins from other straight chain hydrocarbons as well as from branched chain and cyclic hydrocarbons. This is accomplished by utilizing a cadmium or strontium exchanged type X or type Y sieve. In its most particular form, this invention concerns the separation of straight chain olefins from normal paraffins and recovery of olefin streams in high yields by means of a separation made with a cadmium or strontium type X or cadmium or strontium type Y molecular sieve. To accomplish this separation of normal olefins from normal paraffin-containing streams, a critical temperature of from —50° F. to 160° F. must be utilized with the cadmium or strontium type X or cadmium or strontium type Y sieve.

There are numerous instances where the separation of normal olefins from normal paraffins is extremely important in industry. Normal olefins as light as about $C_{10}$ are utilized in the manufacture of biodegradable detergents. The paraffins which are present in the streams must be separated out in order to produce as high a quality detergent as is possible. Furthermore, the separation of paraffins from propylene is also extremely important since propylene, along with many other uses, is a basic building block for the production of polypropylene plastic. Paraffins are contaminants in this case and substantially pure olefin streams are needed. In order to do this, a process is needed which will separate the olefins from the paraffins. The recovery of olefins from catalytic cracked process streams for use as alkylation feed or from steam cracked process streams for alkylation feed or chemical uses is another important use. In the manufacture of ethylene from ethane, a critical step is the separation of the ethylene from the ethane feed. The current method is by superfractionation. This separation could be greatly improved by the use of this new technique.

In the past, a variety of methods have been utilized to separate normal olefins from normal paraffin-containing streams. These streams include isocompounds and cyclic compounds. These methods have met with varying degrees of success. More recently, it was attempted to effect this separation with molecular sieves. This technique also is not totally successful.

A recent U.S. Patent 2,971,993, issued Feb. 14, 1961 represents a substantial advance over the existing separation art. In this patent, cobalt, barium, potassium or silver substituted 13X molecular sieves were utilized to separate normal olefins from normal paraffin-containing streams. This separation was performed at elevated temperatures, in fact temperatures of 175° F. to 400° F. had to be utilized. During the course of the specification, in Example 5, a comparison was made between the previously enumerated type X sieves and other metal exchanged sieves. Two of the sieves which were found to be unsatisfactory for the desired separation were the cadmium and strontium sieves. These sieves caused extensive polymerization at 240° F.

According to this invention, it has unexpectedly been found that cadmium or strontium substituted type X and type Y sieves when utilized at lower temperatures are superior to the other metal-substituted type X sieves for the separation of normal olefins from normal paraffin-containing streams. Neither of these two sieves cause polymerization under the stated conditions.

It has been known for some time that certain zeolites, both naturally occurring and synthetic, have the property of separating normal from isomeric-branched chain hydrocarbons as well as cyclic and aromatic admixtures. The zeolites have crystal patterns such as deformed structures containing a large number of small cavities interconnected by a number of still smaller holes or pores, the latter being of exceptionally uniform size. Only molecues small enough to enter the pores can be absorbed, though not all molecules, even though small enough to enter the pores, will be adsorbed. An affinity of the molecule for the adsorbent must be present. The pores may vary in diameter from 3 to 6 A. units to 8 to 15 or more. A. units, but it is a property of these zeolites or molecular sieves that for a particular size the pores are of substantially uniform size. The adsorbents with pore sizes of 8 to 15 A. units have a high selectivity for aromatics and non-normal hydrocarbons whereas the smaller adsorbents with respect to pore size, that is to say about 3 to 6 A. units, have a higher selectivity for straight chain compounds such as normal paraffins and normal olefins. The adsorbents with pore sizes of 8 to 15 A. units are known as type X sieves.

The scientific and patent literature contain numerous references to the adsorbing action of natural and synthetic zeolites. Among the natural zeolites having this sieve property may be mentioned chabazites and analcite. A synthetic zeolite with molecular sieve properties is described in U.S. Patent 2,442,191. An example of a class of synthetic zeolites which is used to separate normal hydrocarbons from branched hydrocarbons is type A sieve with divalent cations from the alkaline earth sieves, particularly calcium type A. These adsorbents are described in U.S. Patent 2,882,243. An example of a class of adsorbents which is used to separate aromatics and non-hydrocarbons from saturates is type X sieve with monovalent and divalent cations from the alkaline metal and alkaline earth metal sieves, particularly sodium and calcium type X. These adsorbents are described in U.S. Patent 2,882,244. Zeolites vary somewhat in composition but generally contain silicon, aluminum, oxygen and an alkali and/or alkaline earth element, e.g., sodium and/or calcium, magnesium, etc. Analcite has the empirical formula:

$NaAlSi_2O_6 \cdot H_2O$

Barrer (U.S. Patent 2,306,610) teaches that all or part of the sodium is replaceable by calcium to yield on dehydration, a molecular sieve having the formula:

$(CaNa_2) Al_2Si_4O_{12} \cdot 2H_2O$

Black U.S. Patent 2,552,426) describes a synthetic molecular sieve having the formula $4CaO \cdot Al_2O_3 \cdot 4SiO_2$. A large number of other naturally occurring zeolites having molecular sieve activity, i.e., the ability to adsorb a straight chain hydrocarbon and exclude the branched chain isomers, are described in an article "Molecular Sieve Separation of Solids" appearing in Quarterly Reviews, vol. 3,293–330 (1949) and published by the Chemical Society (London).

In U.S. Patent No. 3,130,007 there is described the zeolite type Y sieve. The crystals of zeolite Y are basically 3-dimensional frameworks of $SiO_4$ and $AlO_4$ tetrahedrons cross-linked by the sharing of oxygen atoms. The electrovalence of each tetrahedron containing aluminum is balanced by the presence of the alumino-silicate framework of a cation such as an alkaline metal ion. The void spaces in the framework are occupied by water molecules. Dehydration to effect the loss of water of hydration results in a crystal interlaced with channels of molecular dimensions that offer very high surface areas for the adsorption of certain molecules. The basic chemical formula for zeolite Y expressed in terms of mols of oxides may be written as: $(0.9\pm0.2) Na_2O:Al_2O_3:WSiO_2:XH_2O$, wherein W is a value greater than 3 and up to about 6 and X may be a value up to about 9. As mentioned previously, the entire concept of zeolite type Y is discussed at length in U.S. Patent 3,130,007, this discussion is herein incorporated by reference.

Olefins may be separated from a great variety of feedstocks according to the process of the instant invention; a motor fuel boiling in the range of about 90 to 400° F. may successfully be treated at subatmospheric pressure by the process of this invention to remove it of normal olefins. Other feedstocks which may be treated with the instant invention include ethane/ethylene from the ethane cracker and the $C_2$–$C_{10}$ fraction from the catalytic and steam crackers.

This invention, in a more particular form, is particularly useful in removing olefins in the $C_2$ to $C_{10}$ range, most preferably $C_2$ to $C_8$ and in the most preferred form $C_2$ to $C_6$. This is, of course, not intended to limit the scope of the invention for as would be apparent all normal olefins which are capable of being adsorbed onto a cadmium or strontium type X or cadmium or strontium type Y sieve may be separated by means of the process of the instant invention.

With respect to the sieves, the cadmium or strontium type X and cadmium or strontium type Y sieves of the instant invention produce far superior results when compared to the other metal substituted type X or type Y sieves.

The conditions of the instant invention are extremely critical. The temperature in the molecular sieve separation zone must be between —150° F. and 160° F., preferably —50° F. to 160° F. and most preferably 50° F. to 140° F. If higher temperatures are utilized, there is considerable danger of olefin polymerization and cadmium or strontium are no longer the most effective exchanged type X or type Y molecular sieves. As indicated in U.S. Patent 2,971,993, Example 5, cadmium is not nearly so effective when operating at temperatures of 240° F. With respect to pressures, the pressure may vary from between atmospheric or subatmospheric up to about 100 p.s.i.g. The amount of feed per cycle may vary between .01 and 10 w./w., preferably 0.05 to 5 w./w., and especially preferred 0.1 to 3.0 w./w. The adsorption may take place in either the vapor or liquid phase. It is preferred to use the vapor phase.

The olefin which has been adsorbed onto the cadmium or strontium type X or cadmium or strontium type Y sieve may be desorbed in a variety of ways. Vacuum or elevated temperature may readily be used to facilitate desorption. A combination vacuum and increased temperature will also bring relatively successful results in desorbing the adsorbed olefin. Steam is also an effective desorbent.

However, for purposes of this invention it is preferred to make use of a displacing agent. A displacing agent is defined as a polar or polarizable material having an appreciable affinity for the zeolite adsorbent compared with the material desired to be desorbed. Thus, in the instant case the displacing agent must be more readily adsorbed onto a cadmium or strontium type X or cadmium or strontium type Y molecular sieve than the olefin. The displacing agent will generally have a heat of desorption approximately equal to or greater than the material it is desired to desorb. Other names for the displacing agents include desorbents and desorbing mediums. Suitable displacing agent for the process of this instant invention include $SO_2$, ammonia, carbon dioxide, $C_1$ through $C_5$ alcohol, such as methanol and propanol, glycols such as ethylene glycol and propylene glycol, halogenated compounds such as methyl chloride, ethyl chloride, methyl fluoride, nitrated compounds such as nitromethane and the like. The best displacing agent has the general formula:

wherein $R_1$, $R_2$ and $R_3$ are selected from the group consisting of hydrogen and $C_1$ to $C_5$ alkyl radicals. Thus, the desorbing material which is most preferred includes ammonia and $C_1$ through $C_5$ primary, secondary and tertiary amines with ammonia producing the most outstanding results and the $C_1$ through $C_5$ primary amines next in order of preference. Examples of preferred primary amines include ethylamine, methylamine, butylamine and the like. The displacing agent may be used in either the liquid or vapor phase; once again the vapor phase is preferred. Desorption temperatures may vary between —140° F. and 160° F., preferably —50° F. to 160° F. and most preferably 50° F. to 140° F. The displacing agent should be introduced at a rate of .01 to 10 w./w./hr. Both the adsorption and desorption cycles may be of the same duration. The adsorption cycle should last from 1 to 60 minutes, preferably 1 to 30 minutes and most preferably 1 to 15 minutes. The desorption cycle may also last for this duration or it may be varied if so desired.

In a preferred embodiment of this invention, a feedstock which is a mixture consisting of 65 wt. ethylene, 35 wt. percent ethane (this is the product gas from an ethane cracker) is introduced into a molecular sieve separation zone. Within the molecular sieve separation zone is a cadmium or strontium type X molecular sieve. The feed is introduced at a rate of .01 to 10 w./w. Temperature within the zone is maintained at 50° F. to 140° F. and pressure is ambient. The feedstock is charged to the molecular sieve separation zone for a period of 1 to 15 minutes at which time the adsorption phase ceases. Sievate which consists of ethane is recovered from the other end of the molecular sieve separation zone. At this point the desorption phase begins. Ammonia is used to displace the adsorbed olefins. Ammonia is introduced into the molecular sieve separation zone from the direction opposite to that which the feedstock was introduced. The displacing agent, ammonia, is introduced at a rate of .01 to 10 w./w./hr. for a period of 1 to 15 minutes at a temperature of 50° F. to 140° F. At the end of this time substantially all of the adsorbed olefins have been desorbed. It is determined that about 90 to 95% of the original olefin has been adsorbed onto the molecular sieve and subsequently desorbed. This olefin is about 80 to 100% pure. Substantially identical results could be achieved if a cadmium or strontium type Y molecular sieve was substituted for the cadmium or strontium type X molecular sieve.

*Example I*

In order to compare a cadmium and strontium type X molecular sieve with various other exchanged molecular sieves, the following examples are run. Comparisons are made in this example between potassium, calcium, strontium and cadmium type X molecular sieves under identical conditions.

The molecular sieve separation zone is maintained at a temperature of 150° F. and adsorption isotherms are run over the pressure range of 0 to 200 mm. of mercury. The feed in one case is ethane and ethylene in the other. A comparison of the amounts of each gas adsorbed at 10 mm. of mercury gives the following separation factors.

Metal-exchanged type X sieve:     Ratio $C_2H_4/C_2H_6$
- Potassium (K) _____ 2
- Calcium (Ca) _____ 12.5
- Strontium (Sr) _____ 22
- Cadmium (Cd) _____ 26

It is understood that the adsorption isotherms are a suitable standard method of determining the amount of gas that is adsorbed on a surface.

Thus, from the above it is readily apparent that the separation factor for cadmium and strontium is 13 times better than that for potassium. The factor for cadmium and strontium is also more than twice as effective as for calcium.

*Example II*

In this example the identical conditions as in Example I are utilized except that type Y sieve with potassium, calcium, strontium and cadmium are utilized rather than the type X sieve of Example I. The results are substantially identical with the results of Example I indicating that the cadmium and strontium type Y sieve are also superior to the other metal exchanged sieves with which it is compared.

The above examples indicate that cadmium and strontium type Y and cadmium and strontium type X molecular sieves when utilized within the critical temperature range of this invention are superior to other types of molecular sieves. This is totally unexpected in view of the fact that a cadmium and strontium type X sieve at higher temperatures is not nearly so effective an adsorbent for separating olefins from paraffins.

Although this invention has been described with some degree of particularity, it is intended only to be limited by the attached claims.

What is claimed is:

1. A process for separating olefins from olefin containing streams which comprises passing a stream containing olefinic and non-olefinic constitutents through a molecular sieve adsorption zone, the said molecular sieve adsorption zone containing a molecular sieve selected from the group consisting of cadmium type X, strontium type X, cadmium type Y or strontium type Y molecular sieves whereby the said olefins are selectively adsorbed, said sieve zone being maintained at a temperature of −50° F. to 160° F.

2. A process for separating olefins from admixtures of said olefins with paraffins which comprises contacting said mixture with a cadmium type X molecular sieve in an adsorption zone, said zone being maintained at a temperature of −50° F. to 160° F., whereby said olefins are selectively adsorbed.

3. The process of claim 2 wherein said adsorption period is 1 to 60 minutes.

4. Process of claim 2 wherein a strontium type X molecular sieve is substituted for the cadmium type X molecular sieve.

5. A process for selectively separating olefins from admixtures with paraffins which comprises contacting said mixture with a molecular sieve selected from the group consisting of cadmium type X, strontium type X, cadmium type Y and strontium type Y molecular sieves at a temperature of −50° F. to 160° F., whereby said olefins are selectively adsorbed, desorbing said molecular sieve and thereby recovering a high purity olefin concentration.

6. The process of claim 5 wherein said desorption is effected by means of vacuum.

7. The process according to claim 5 wherein said desorption is effected with a displacing agent, said displacing agent having the format

wherein $R_1$, $R_2$ and $R_3$ are selected from the group consisting of $C_1$ to $C_5$ alkyl radicals and hydrogen.

8. The process of claim 5 wherein said mixture is introduced into the molecular sieve separation zone in the vapor phase.

9. A process for separating olefins from paraffin containing mixtures which comprises passing said mixture into a cadmium type X molecular sieve separation zone at a temperature of −50° F. to 160° F., wherein said olefins are selectively adsorbed, displacing said adsorbed olefin with a displacing agent wherein a high purity olefin stream is recovered.

10. The process of claim 9 wherein the said displacing agent has the format

wherein $R_1$, $R_2$ and $R_3$ are selected from the group consisting of $C_1$ to $C_5$ alkyl radicals and hydrogen.

11. The process of claim 9 wherein said displacing agent is ammonia.

12. The process of claim 9 wherein said adsorption and desorption take place at substantially the same temperature.

13. An improved process for separating normal olefins from admixture with normal paraffins in a feedstream which comprises passing said feedstream through a molecular sieve separation zone, said zone containing a cadmium type Y molecular sieve at a temperature of −50° F. to 160° F., whereby said olefins are selectively adsorbed onto said molecular sieve, desorbing said olefins with a displacing agent whereby an olefin rich stream is recovered.

14. The process of claim 13 wherein said displacing agent has the format

wherein $R_1$, $R_2$ and $R_3$ are selected from the group consisting of $C_1$ to $C_5$ alkyl radicals and hydrogen.

15. The process of claim 14 wherein said displacing agent is ammonia.

16. The process of claim 13 wherein said adsorption takes place in the vapor phase.

17. The process of claim 13 wherein a strontium type Y sieve is utilized instead of a cadmium type Y sieve.

18. A process for separating olefins from paraffin containing mixtures which comprises passing said mixture into a molecular sieve separation zone, said zone containing a strontium type X molecular sieve, said zone maintained at a temperature of −50° F. to 160° F., wherein said olefins are selectively adsorbed, displacing said adsorbed olefin with a displacing agent wherein a high purity olefin stream is recovered.

19. The process of claim 18 wherein said displacing agent is ammonia.

References Cited

UNITED STATES PATENTS

| | | | |
|---|---|---|---|
| 2,971,993 | 2/1961 | Kimberlin et al. | 260—677 |
| 2,988,503 | 6/1961 | Milton et al. | 260—674 |
| 3,063,934 | 11/1962 | Epperly et al. | 260—674 |
| 3,106,593 | 10/1963 | Benesi et al. | 260—676 |
| 3,182,017 | 5/1965 | Fleck et al. | 208—310 |
| 3,242,070 | 3/1966 | Epperly et al. | 208—310 |

HERBERT LEVINE, *Primary Examiner.*